US006747964B1

(12) United States Patent
Bender

(10) Patent No.: US 6,747,964 B1
(45) Date of Patent: Jun. 8, 2004

(54) METHOD AND APPARATUS FOR HIGH DATA RATE TRANSMISSION IN A WIRELESS COMMUNICATION SYSTEM

(75) Inventor: Paul Bender, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 353 days.

(21) Appl. No.: 09/663,519

(22) Filed: Sep. 15, 2000

(51) Int. Cl.[7] .................... H04L 12/28; H04B 7/216; H04J 1/00
(52) U.S. Cl. .................. 370/335; 370/343; 370/401; 375/222; 709/105
(58) Field of Search ................. 370/335, 342, 370/392, 468, 401, 343, 391, 467, 465; 375/222; 709/105; 455/422

(56) References Cited

U.S. PATENT DOCUMENTS

| | | | | |
|---|---|---|---|---|
| 5,839,052 A | * | 11/1998 | Dean et al. | 455/5.1 |
| 5,999,565 A | * | 12/1999 | Locklear et al. | 375/222 |
| 6,178,448 B1 | * | 1/2001 | Gray et al. | 709/224 |

FOREIGN PATENT DOCUMENTS

| | | |
|---|---|---|
| EP | 11122321 | 4/1999 |
| WO | 99/43133 | 8/1999 |
| WO | 01/56190 A2 | 8/2001 |

OTHER PUBLICATIONS

Keith Sklower, The PPP Multilink Protocol (MP), http://www.faqs.org/rfes/rfel717.htm, Internet RFC/STD/FYI/BCP Archives, Newbridge Networks Corporation, Nov. 1994.

Y. Kamio et al. "Implementation and Performance Evaluation of 384 kbit/s–PHS Experimental System," IEICE Transactions on Communications, Aug. 2000, Inst. Electron. Inf. & Commun. Eng, Japan, vol. E83–B, No. 8, pp. 1844–1853.

G.E. Conant, "Multilink PPP: One Big Virtual Wan Pipe," Data Communications, McGraw Hill, New York, US, vol. 24, No. 13, Sep. 21, 1995, pp. 85–88, 90.

Y. Reshef et al., "Reliable Multilink Protocols," IEEE Transactions on Communications, IEEE Inc. New York, US, vol. 41, No. 12, Dec. 1, 1993, pp. 1780–1784.

* cited by examiner

Primary Examiner—Duc Ho
(74) Attorney, Agent, or Firm—Philip Wadsworth; Kent D. Baker; Sandra L. Godsey

(57) ABSTRACT

In a wireless communication system a method for high data rate transmission aggregates information signals processed by at least two modems, wherein the modulated information signals are transmitted using two carrier frequencies. The method provides multiple data transmissions concurrently over a broad bandwidth consistent with single transmission air-interface standards. An apparatus, mobile unit, includes a multi-link (ML) protocol processor that aggregates the information signals from the modems into a point-to-point protocol (PPP) format for interface with conventional data-based systems, such as the internet. The ML processor further receives an aggregated bundle and separates the bundle into its constituent parts for modulation by the modems.

20 Claims, 5 Drawing Sheets

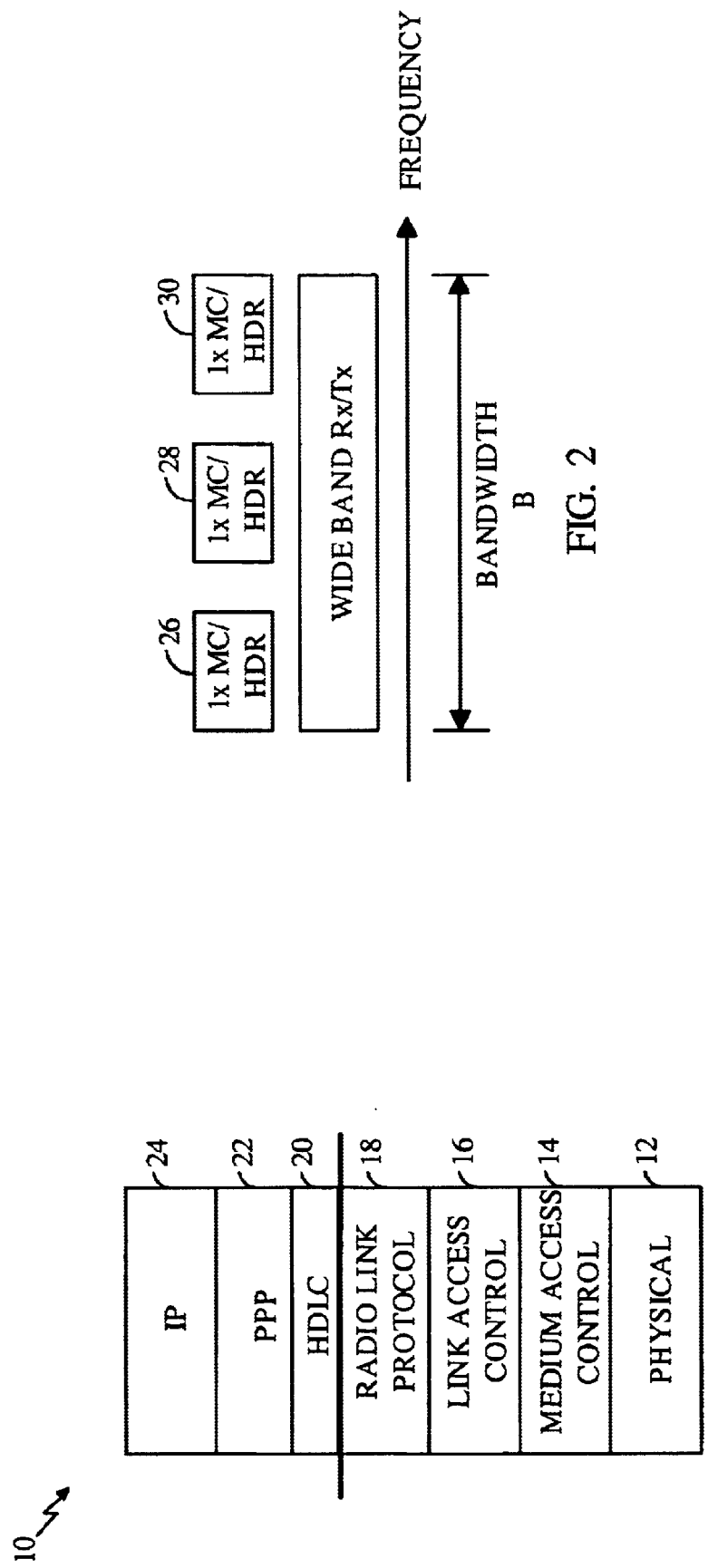

METHOD AND APPARATUS FOR HIGH DATA RATE TRANSMISSION IN A WIRELESS COMMUNICATION SYSTEM

REFERENCE TO RELATED CO-PENDING APPLICATIONS FOR PATENT

The present invention relates is related to the following U.S. Application for Patent:

U.S. patent application Ser. No. 08/963,386 entitled "Method and Apparatus for High Rate Packet Data Transmission," filed on Nov. 3, 1997, now U.S. Pat. No. 6,574,211, issued on Jun. 3, 2003 and assigned to the assignee hereof which is hereby expressly incorporated by reference herein.

FIELD

The present invention relates to wireless data communication. More particularly, the present invention relates to a novel and improved method and apparatus for high data rate transmission in a wireless communication system.

BACKGROUND

The easy access to information, via the internet, for example, has increased the demand for wireless data services. Wireless communication equipment is currently in place to accommodate mobile users for voice communications worldwide. Current systems include Code Division Multiple Access (CDMA), Global System for Mobile Communications (GSM), proposed High Data Rate (HDR) systems, and various proposed third generation CDMA systems, each having predefined protocols for transmission and processing of information. As there are significant differences between the requirements and applications of voice and data services, many existing wireless systems designed for voice communications and lower data rate transmissions are not readily extendible to higher data rate transmissions.

There is a need for a method for high data rate transmission compatible with existing systems and technology. Further, there is a need for a method of data transmission that does not require new and/or modified radio network protocols for transmission.

SUMMARY

The disclosed embodiments provide a novel and improved method for high data rate transmission in a wireless communication system. In one embodiment, a CDMA wireless communication system implements a Multi-Link Point-to-Point Protocol (ML-PPP) to aggregate data streams received from a wide bandwidth transmission. The aggregated data is then available for data processing, such as interface with an internet protocol. For transmission from a mobile unit, data is received in ML-PPP format and separated into individual data streams. Each data stream is modulated on a different carrier and broadcast concurrently. The application of ML-PPP allows high data rate transmissions in a CDMA system without requiring new and/or modified air interface radio network protocols and provides a data rate higher than achievable using a single carrier.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein:

FIG. 1 illustrates a layering architecture of a wireless communication system according to one embodiment;

FIG. 2 illustrates a frequency bandwidth assignment of one embodiment in comparison with a prior art wireless communication systems;

DETAILED DESCRIPTION OF THE PREFERRED EMBODIMENTS

Figure 3:
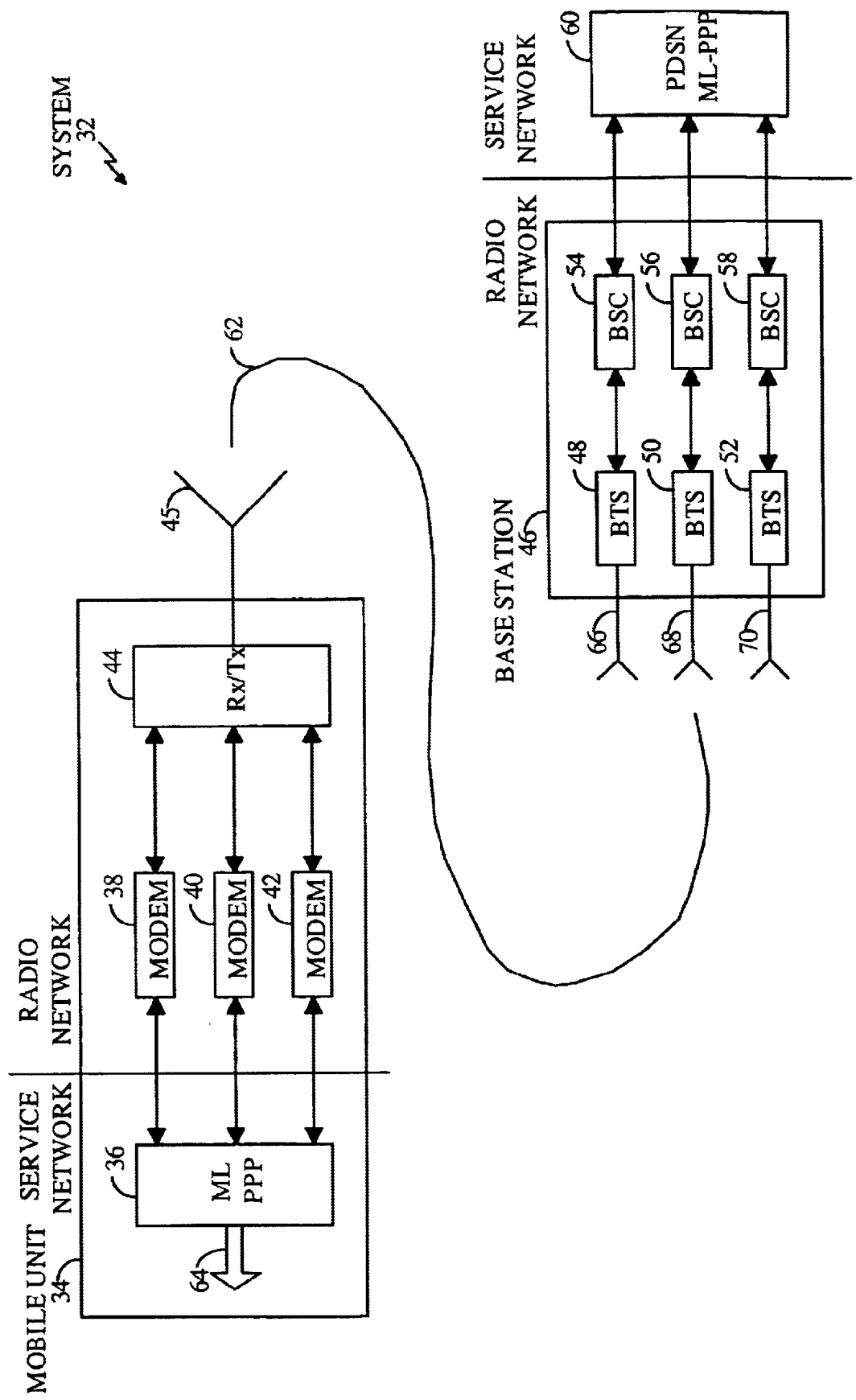
FIG. 3 illustrates a wireless communication system having an architecture as in FIG.1 according to one embodiment.

In an exemplary embodiment of the present invention, a CDMA wireless communication system implements an ML-PPP type protocol to aggregate data streams received from a wide bandwidth transmission using an HDR air-interface method. While other embodiments may implement any of a variety of per-user connection methods, HDR is very efficient specifically for data transmissions.

FIG. 1 illustrates an architectural layering 10 of an exemplary embodiment of the present invention. The physical layer 12 indicates the channel structure, frequency, power output, modulation type, and encoding specifications for the forward and reverse links. The Medium Access Control (MAC) layer 14 defines the procedures used to receive and transmit over the physical layer 12. For an HDR system, the MAC layer 14 includes scheduling capabilities to balance users or connections. Such balancing typically schedules low throughput for channels with poor coverage, thus freeing up resources allowing high throughput for channels with good connections. The next layer, the Link Access Control (LAC) layer 16, provides an access procedure for the radio link. The Radio Link Protocol (RLP) layer 18 provides retransmission and duplicate detection for an octet-aligned data stream. In the context of a packet service, the LAC layer 16 carries Point-to-Point Protocol (PPP) packets. The High Level Data Link Control HDLC layer 20 is a link layer for PPP and ML-PPP communications. Control information is placed in specific patterns, which are dramatically different from the data in order to reduce errors. The HDLC layer 20 performs framing of the data prior to PPP processing. The PPP layer 22 then provides compression, authentication, encryption and multi-protocol support. The Internet Protocol (IP) layer 24 keeps track of internetwork addressing for different nodes, routes outgoing messages, and recognizes incoming messages.

Protocols running on top of PPP, such as IP layer 24, carry user traffic. Note that each of these layers may contain one or more protocols. Protocols use signaling messages and/or headers to convey information to a peer entity on the other side of the air-interface. For example, in a High Data Rate (HDR) system, protocols send messages with a default signaling application.

The architecture 10 is applicable to an Access Network (AN) for providing data connectivity between an IP network, such as the Internet, and access terminals, including wireless mobile units. Access Terminals (ATs) provide data connectivity to a user. An AT may be connected to a computing device such as a laptop personal computer or may be a self-contained data device such as a personal digital assistant. There are a variety of wireless applications and an ever increasing number of devices, often referred to as IP appliances or web appliances. As illustrated in FIG. 1, layers above the RLP layer 18 are service network layers and layers below the HDLC layer 20 are radio network layers. In other words, the radio network layers effect the air-interface protocols. The radio network layers of the exemplary embodiment implement the "TL80-54421-1 HDR Air Interface Specification" referred to as "the HAI specification." The HAI specification is sometimes referred to as "1xEVDO." HDR generally provides an efficient method of transmitting data in a wireless communication system. Alternate embodiments may implement the "TIA/EIA/IS-2000 Standards for cdma2000 Spread Spectrum Systems" referred to as "the cdma2000 standard," the "TIA/EIA/IS-95 Mobile Station-Base Station Compatibility Standard for Dual-Mode Wideband Spread Spectrum Cellular System," hereinafter referred to as "the IS-95 standard," or other per-user connection systems, such as the "ANSI J-STD-01 Draft Standard for W-CDMA (Wideband Code Division Multiple Access) Air Interface Compatibility Standard for 1.85 to 1.99 GHz PCS Applications" referred to as "W-CDMA."

The use of a multiple access system for voice and data transmissions is disclosed in the following U.S. Patents:

U.S. Pat. No. 4,901,307, entitled "SPREAD SPECTRUM MULTIPLE ACCESS COMMUNICATION SYSTEM USING SATELLITE OR TERRESTRIAL REPEATERS;"

U.S. Pat. No. 5,103,459, entitled "SYSTEM AND METHOD FOR GENERATING WAVEFORMS IN A CDMA CELLULAR TELEPHONE SYSTEM;"

U.S. Pat. No. 5,504,773, entitled "METHOD AND APPARATUS FOR FORMATTING OF DATA FOR TRANSMISSION;"

each assigned to the assignee hereof and expressly incorporated by reference herein. As the frequency spectrum is a finite resource, these systems provide methods for maximizing the use of this resource by sharing the spectrum while supporting a large number of users with minimal interference. The extension of these methods to the high speed transmission of data allows reuse of existing hardware and software. Designers already familiar with such standards and methods may use this knowledge and experience to extend these systems to high speed data transmissions.

Figure 4:
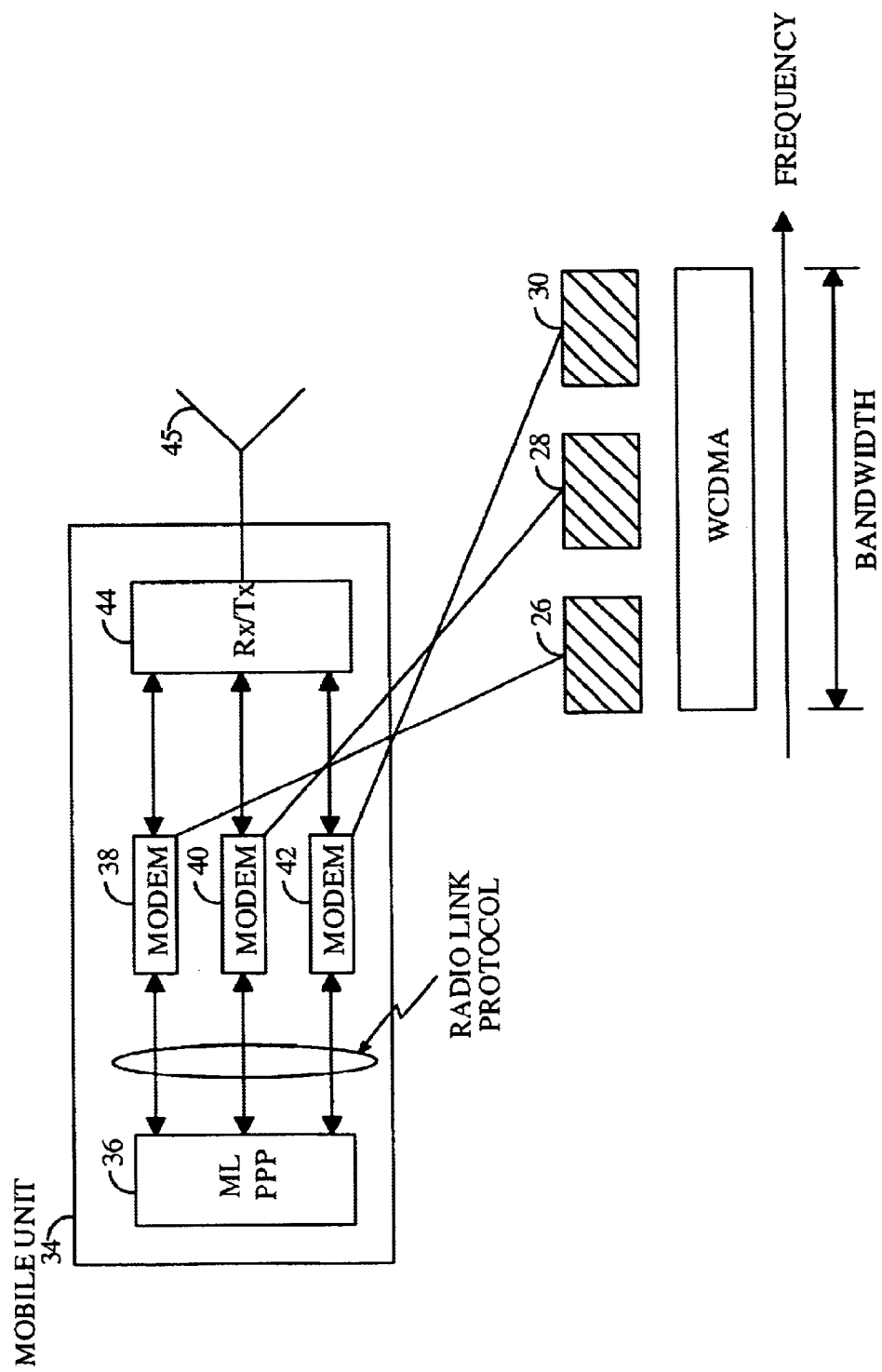
FIG. 4 illustrates a mobile unit according to one embodiment.

In one embodiment, implementation of the architecture 10 in a wireless system, as shown in FIGS. 3 and 4, allows the use of multiple carriers for transmitting data. The multiple carriers may be included in a wide bandwidth frequency allocation, such as that illustrated in FIG. 2. A given bandwidth B is indicated along the horizontal frequency axis. In one embodiment B is approximately 5 MHz. As illustrated, a wideband transceiver channel, such as WCDMA, consumes the entire bandwidth B. As the wideband protocol was designed for voice communications, it is not readily extendible to data communications and is inefficient for mixing voice and data. Note that the bandwidth B is sufficient for three (3) single CDMA carriers, such as 1.25 MHz (1xMC). This concept is exploited in 3xMC by changing the radio network air-interface protocols, and transmitting data streams on distinct carriers.

In the exemplary embodiment of the present invention, the ML-PPP is used to aggregate the three (3) carriers 26, 28, 30 into fragments formatted for PPP processing and IP routing without creating a new air-interface or changing the existing radio network air-interface, i.e. using existing layers 12, 14, 16, 18 of architecture 10 of FIG. 1.

In accordance with one embodiment, FIG. 3 illustrates a wireless system 32 having a mobile unit 34 coupled to a base station 46 via an air-interface 62. The system 32 includes radio network portions and service network portions, each defined according to architecture layers illustrated in FIG. 1. The mobile unit 34 includes an ML-PPP processor 36 bi-directionally coupled to three (3) modems 38, 40, 42. The Radio Link Protocol layer is implemented via the connections. As indicated, the service network layers are implemented on the ML-PPP processor 36 side and the radio network layers on the modem side. The modems 38, 40, 42 are further bi-directionally coupled to an analog transceiver unit 44. Air-interface transmissions may be performed consistent with the CDMA standards, including but not limited to IS-95, IS-2000, W-CDMA and HDR. For an exemplary embodiment, HAI specifies the reverse channel encoding and repetition, interleaving, code generation and error correction steps consistent with the specification. Similarly, the physical layer 12 specifies the forward channel pilot, sync, and paging generation, as well as modulation, demodulation and coding to effect the spread spectrum transmission over the air-interface.

The ML-PPP processor 36 performs multi-link operations to coordinate multiple independent links, thus providing a virtual link having a larger bandwidth than each constituent link. In this embodiment, the individual links are processed via each modem 38, 40, 42, the aggregated data is transmitted as a bundle via conductor(s) 64. According to ML-PPP, "fragments" are formed when a single data stream is broken into multiple streams. Typically, each fragment includes a header containing a sequence number and field(s) indicating the beginning or termination of a packet. In the exemplary embodiment, each ML-PPP fragment is an IP packet and therefore is a beginning and a termination packet.

Each signal modulated or demodulated by modems 38, 40, 42 is received at or transmitted from mobile unit 34 via analog transceiver 44, which is coupled to an antenna 45. Each modem is associated with a specific carrier and the mobile unit 34 transfers and receives signals of each carrier via antenna 45.

Using ML-PPP, or a similar multi-link type protocol, the data may be split and recombined, reducing latency and improving throughput. The composition of fragments may be designed and scheduled so as to improve loading, and thus result in efficient use of bandwidth. In the exemplary embodiment of FIG. 3, data packets for transmission from mobile unit 34 are received by ML-PPP processor 36, via conductor(s) 64, as fragments. The data are received as IP packets having been transmitted from an IP network or a computer network. The data packets received comprise three (3) independent data streams. A data stream may be considered a communication pipeline. The independent data streams have been broken into IP packets. In the exemplary embodiment each IP packet is an ML-PPP fragment and, therefore, the IP packets are aggregated into an ML-PPP bundle. The IP packets are pieces of the data stream that contain a source and destination but are not necessarily related to adjacent packets.

The ML-PPP processor 36 separates the fragments and reconstructs the three (3) original data streams. One of the three (3) data stream is fed to modem 38, another to modem 40, and still another to modem 42. Each modem 38, 40, 42 modulates the received data stream on a unique carrier, i.e., three (3) different frequencies are used. From modems 38, 40, 42, the data streams are provided to analog transceiver 44 for transmission. Each of the independent data streams is then transmitted at a different frequency within a predetermined bandwidth. Effectively, each data stream has a corresponding bandwidth wherein, ideally, the three (3) bandwidths do not overlap. Alternate embodiments may employ any number of modems to reflect any number of separate bandwidths.

FIG. 4 illustrates the correspondence between modem carrier and bandwidth for an exemplary system in accordance with one embodiment. For data received by mobile unit 34, the signals are separated by carrier frequency and sorted to their appropriate modem for processing. From modems 38, 40, 42 the baseband signal is provided to ML-PPP processor 36 for aggregation and transmission as a bundle via conductor(s) 64. The ML-PPP processor 36 operates according to software that is specific to the requirements of mobile unit 34 and air-interface 62. Data is fragmented and combined according to a desired scheme. At this point the ML-PPP processor 36 may perform load balancing, where for example, the modem 42 has a higher throughput than the modem 38. In this case, the aggregated bundle generated by ML-PPP processor 36 will include more fragments of data for modem 42 than for modem 38. The process is dynamic and as the load changes for data processed by mobile unit 34, ML-PPP processor 36 will adjust the bundles accordingly.

For an HDR communication system, the MAC layer is typically designed to handle load balancing by scheduling users according to quality of service. A grade of service is determined based on the coverage of a user, or in this case of a carrier, and results in allocation of throughput to those users having better coverage. Coverage is affected by the number of users in the system, the physical environment, degree of fast fading, multipaths, etc. System 32 may exploit the built-in load balancing capability of the MAC layer to schedule the three (3) modems 38, 40, 42 according to the grade of service of each of the three (3) communications. When the transmission of a given carrier is degraded due to user interference, environmental limitations, etc., that carrier will be scheduled for lower throughput, which may result in an increased throughput for another carrier with higher grade of service.

Additionally, load balancing may be implemented in the IP layer 24, wherein throughput is determined by the target IP address. At this level the source and destination of all IP packets is known, and therefore any combination of modems 38, 40, 42 may be implemented. Scheduling at the IP layer removes the ML-PPP from the scheduling decisions. In one embodiment, data is processed on multiple paths, each having a PPP processor. Each path is then provided to a router. The router enables the IP scheduling by selecting between the available paths.

Note that ML-PPP processor 36 may be implemented with a microprocessor having memory for storing software instructions to perform the multi-link aggregation and separation. Further, hardware, firmware, or a combination thereof may be implemented for efficiency and to increase speed. The specific operation of the ML-PPP may be designed so as to be unique to the system 32. The ML-PPP processor 36 provides the interface between typical PPP transactions and wireless radio network transmissions. Overlaying multi-link capability over the PPP interface allows full utilization of a wide bandwidth while maintaining a high quality of transmissions.

Continuing with FIG. 3, the mobile unit 34 transmits data to, and receives data from, base station 46 via air-interface 62. As illustrated in FIG. 1, protocols below layer 18 define radio link transmissions over air-interface 62. The corresponding base station 46 receives the multi-carrier transmission at three (3) antennas 66, 68, 70. Each data stream has a corresponding path in base station 46, where each path corresponds to a carrier frequency band (see FIG. 4). Each path includes a Base Transceiver Subsystem (BTS) that generates the forward CDMA channel and demodulates the mobile transmissions. For voice transmissions the BTS produces vocoded frames. Each antenna 66, 68, 70 is coupled to a BTS 48, 50, 52, respectively. Each BTS 48, 50, 52 is then coupled to a Base Station Controller (BSC) 54, 56, 58, respectively. For voice transmissions, a BSC receives vocoded frames from the BTS and converts them into PCM signals. Alternate embodiments may provide an integrated BTS for handling multiple paths. For voice transmissions from base station 46, a BSC converts the landline voice signals into vocoded frames then sends them to an appropriate BTS. Alternate embodiments may provide an integrated BSC for interfacing with multiple BTSs or an integrated BTS. The BTS transmits the received information via a corresponding antenna having a predetermined carrier frequency bandwidth. Each BSC 54, 56, 58 is coupled to a Packet Data Services Node (PDSN) 60. In this way, the base station 46 is able to process multi-carrier transmissions with mobile unit 34. The PDSN 60 uses ML-PPP to process data for communication with an IP network.

Signals transmitted from mobile unit 34 are sent via the air-interface 62 and received at base station 46 as single-user signals. In other words, the signal modulated by modem 38 is received by antenna 66 and demodulated at BTS 48, the signal modulated by modem 40 is received by antenna 68 and demodulated at BTS 50, etc. Each of these individual pairs acts as a single-user channel in a wireless system, such as a CDMA system according to the IS-95 standard. To each path of base station 46 the transmissions are typical single-user transmissions and are handled independently by the mobile unit 34. The base station 46 includes multiple paths to accommodate each modem of mobile unit 34. In one embodiment, the mobile unit 34 includes the capability to modulate a greater number of carrier frequencies than available at base station 46. In this case, the mobile unit 34 only uses the paths available for processing at base station 46. In this way, the mobile unit 34 may interface with a variety of base stations, after determining the capability and capacity of base station 46.

Signals from the base station 46 are received at the PDSN 60 in IP format. The PDSN 60 separates the aggregated bundle using ML-PPP processing. Each fragment is assigned a sequence number. The sequence number assists the mobile unit 34 in reassembling the bundle. The PDSN 60 then outputs ML-PPP fragments. At this point, HDLC framing occurs. The fragments are provided to the BSCs 54, 56, 58 to generate RLP packets. The RLP packets are ML-PPP packets and may include signaling information. The RLP packets are then provided to the BTSs 48, 50, 52 for transmission via the air-interface 62. The mobile unit 34 receives the signals from the BTSs 48, 50, 52, and in response the modems 38, 40, 42 recover the RLP packets, which are further processed to form ML-PPP fragments. The ML-PPP PPP processor 36 aggregates the fragments and transmits the resulting bundle to the IP network.

Figure 5:
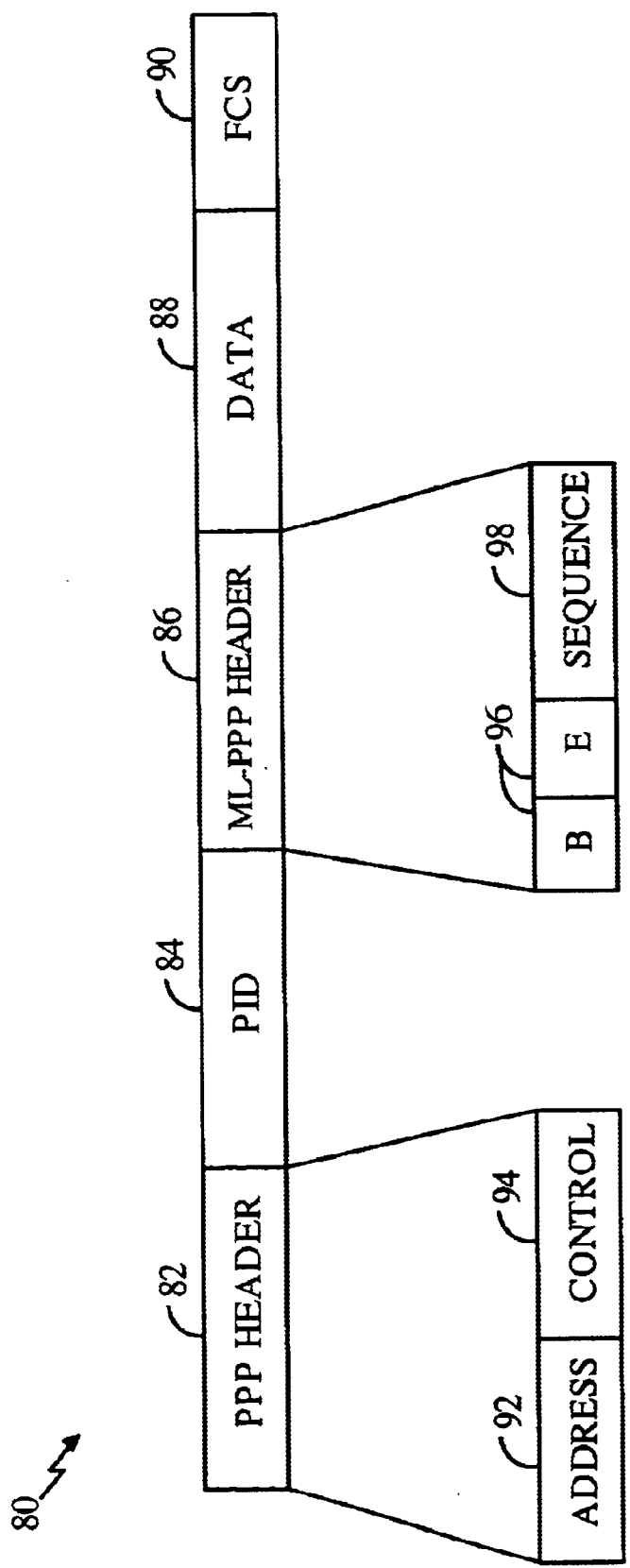
FIG. 5 illustrates load balancing in a wireless communication system according to one embodiment.

FIG. 5 illustrates a multi-link fragment format 80 according to one embodiment. Each fragment contains a portion of one data stream. Within a fragment a first portion or field contains a PPP header 82. Within the PPP header 82 are an address field 92 and a control field 94.

The PPP header is followed by a protocol identifier (PID) 84, which is followed by a ML-PPP header 86 made up of a sequence field 98 that increments with each fragment in a PPP data packet, and alignment fields 96 indicating whether the fragment begins or ends a PPP data packet. The exemplary embodiment implements a non-fragmented ML-PPP format. A PPP data packet is part of a data stream intended for communication between two (2) resources. The ML-PPP bundle includes several data streams for multiple pairs of resources broken into PPP packets. The fragments for the multiple pairs of resources are then aggregated, i.e., interleaved, to form a bundle. The term bundle refers to the bundling of the links between the multiple pairs of resources. The alignment fields 96 assist in keeping the fragments of a PPP data packet together, and identify where each fragment begins and ends. In one embodiment illustrated in FIG. 5, the alignment fields 96 include a beginning bit "B" and an ending bit "E." These bits are cleared for all fragments except the first and last fragments in a packet.

Note that during transmission, the size of the ML-PPP header 86 may be reduced upon coordination with the other participant. The fragment data 88 follows the ML-PPP header 86. Finally, a Frame Check Sequence (FCS) field 90 or other error correction field is appended to the fragment. The FCS field 90 may be used for to check for parity or to calculate a check-sum to verify transmitted data.

Figure 6:
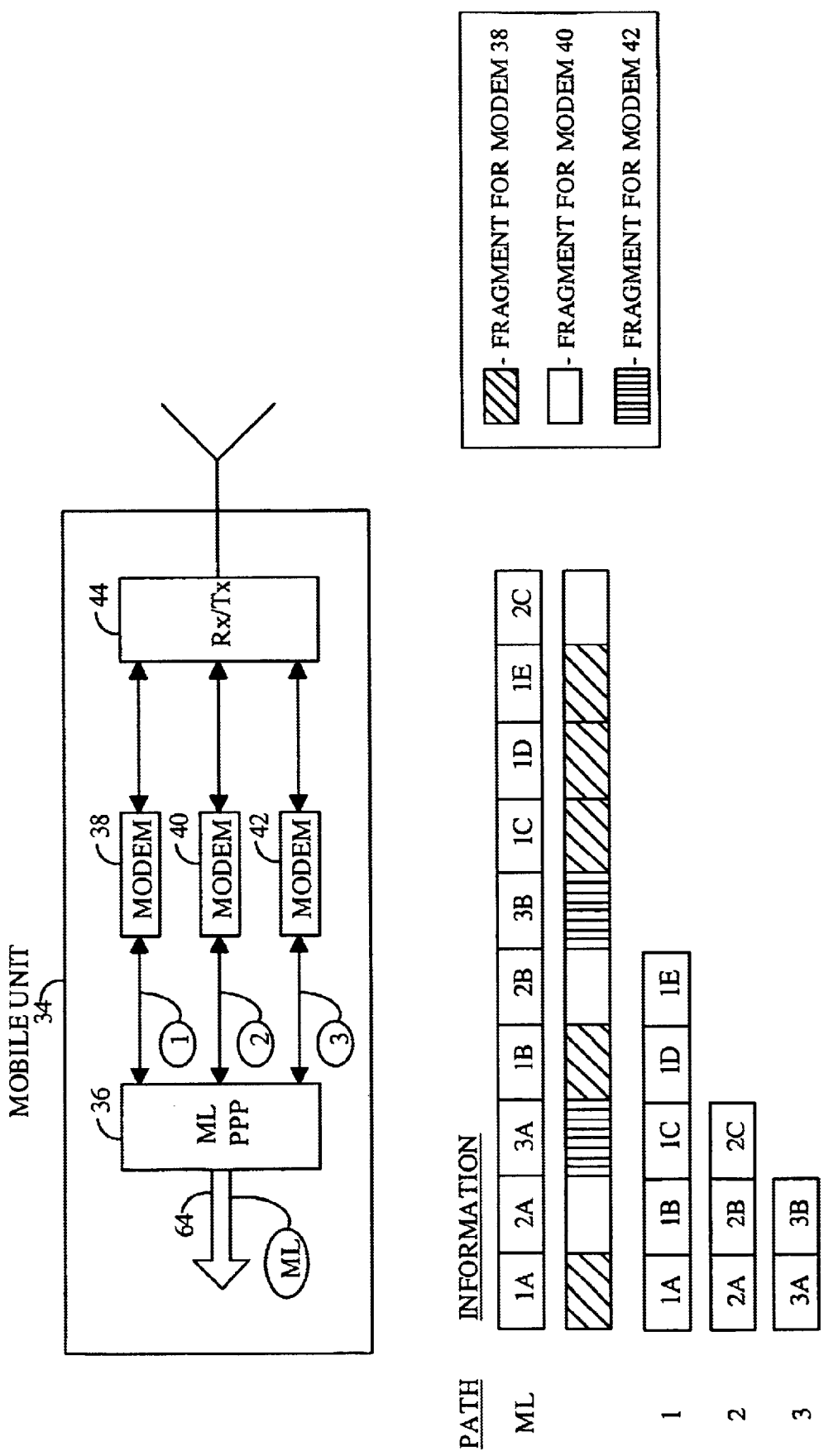
FIG. 6 illustrates a multi-carrier transmission within a system of data received via conductor(s) and transmitted from a mobile unit over an air-interface.

FIG. 6 illustrates a multi-carrier transmission within system 32 of data received via conductor(s) 64 and transmitted from mobile unit 34 over the air-interface 62. The data is received in an ML-PPP bundle, a portion of which is illustrated for the path labeled "ML." The bundle is made up of a series of fragments illustrated in reverse time order starting on the left. Each fragment is identified by a path number and a sequence letter. All of the fragments that were processed by modem 38 come via path "1," fragments from modem 40 via path "2," and fragments from modem 42 via path "3." As illustrated, the first fragment is from path 1, labeled "1A." The next fragment is from path "2" labeled "2A," and the next from path "3" labeled "3A."

Similarly, the next four fragments are received in the same order, cycling through paths 1, 2 and 3, respectively. At some point before the eighth fragment the ML-PPP processor 36 determines that modem 38 requires more processing time than the other modems 40, 42. By the eighth fragment, the ML-PPP processor 36 adjusts the scheduling to try and accommodate modem 38 and at this point two (2) extra frames are allocated to modem 38. The data transmitted from each modem to ML-PPP processor 36 is also illustrated. As shown, the ML-PPP 36 receives three (3) data streams, separates the data into fragments, and aggregates the fragments. The aggregated bundle is then provided to different locations via conductor(s) 64.

For data transmitted from mobile unit 34, ML-PPP 36 receives aggregated data and separates it into its constituent data streams according to its destination. The received data is typically network traffic in the form of IP packets.

According to the exemplary embodiment, the ML-PPP processor 36 determines a data rate associated with each data stream, i.e., associated with each modem. Load balancing is performed to prefer the high data rate modem. In this way, the latency of the system is reduced.

According to an exemplary embodiment, the mobile unit 34 includes a memory storage device (not shown) for storing computer readable instructions controlling the operation of mobile unit 34. The memory storage may be included within the ML-PPP processor 36. The instructions operate in coordination with dedicated hardware for aggregating and separating the information signals, modulating and demodulating the information signals, and transmitting and receiving signals via the air-interface. Included may be instructions implementing decision criteria for load balancing, as well as specifics on implementations. In one embodiment, the ML-PPP 36 is made up of at least one application specific integrated circuit. Alternate embodiments may implement a combination of hardware, software, and/or firmware designed to perform the various functions of mobile unit 34.

In one embodiment of the present invention, the mobile unit 34 includes a parallel processing path (not shown) for voice communications. The voice path includes a modem coupled to a vocoder for processing speech. The data path having three (3) modems and the voice path having one (1) modem may operate concurrently.

Thus, a novel and improved method and apparatus for high data rate transmission in a wireless communication system has been described. While the exemplary embodiment discussed herein describes a HDR CDMA system, such as described by the HAI specification, various embodiments of the present invention are applicable to any wireless per-user connection method. To effect efficient communications, the exemplary embodiment is described with respect to HDR, but may also be efficient in application to IS-95, W-CDMA, IS-2000, GSM, TDMA, etc.

Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A mobile wireless communication apparatus, comprising:
a first modem operative to demodulate a first signal having a first carrier frequency to produce a first information signal;
a second modem operative to demodulate a second signal having a second carrier frequency to produce a second information signal, wherein the first carrier frequency is different from the second carrier frequency; and
a multi-link internet protocol processor operative to aggregate the first and second information signals.

2. The apparatus of claim 1, wherein an aggregation of the first and second information signals is in point-to-point protocol (PPP) format.

3. The apparatus of claim 1, further comprising:
a third modem coupled to the multi-link internet protocol processor, the third modem operative to demodulate a third signal having a third carrier frequency to produce a third information signal,
wherein the third carrier frequency is different from the first and second carrier frequencies.

4. The apparatus of claim 3, wherein the first, second and third carrier frequencies are within a predetermined bandwidth.

5. The apparatus of claim 1, further comprising:
an analog unit coupled to the first and second modems, the analog unit operative to receive the first signal at the first carrier frequency and the second signal at the second carrier frequency.

6. The apparatus of claim 5, wherein the analog unit is operative to receive signals at the first and second carrier frequencies and provide each of said signals to a corresponding one of the first and second modems.

7. The apparatus of claim 6, wherein the first modem is operative to modulate information signals at the first carrier frequency and the second modem is operative to modulate information signals at the second carrier frequency.

8. The apparatus of claim 1, wherein the multi-link internet protocol processor is operative to schedule the first and second information signals to perform load balancing of the first and second modems.

9. The apparatus of claim 8, wherein the multi-link internet protocol processor operates according to a plurality of computer readable instructions stored in the apparatus.

10. A wireless communication apparatus, comprising:
a first modem operative to demodulate a first signal having a first carrier frequency to produce a first information signal;
a second modem operative to demodulate a second signal having a second carrier frequency to produce a second information signal, wherein the first carrier frequency is different from the second carrier frequency; and
a multi-link internet protocol processor operative to aggregate the first and second information signals, wherein the multi-link internet protocol processor is operative to schedule the first and second information signals to perform load balancing of the first and second modems, and wherein the multi-link internet protocol processor is operative to produce an aggregate bundle comprising more fragments of the first information signal than fragments of the second information signal.

11. In a wireless communication system, a method comprising:
receiving a plurality of signals each having a unique carrier frequency;
demodulating each of the plurality of signals into a plurality of information signals; and
aggregating the plurality of information signals.

12. The method of claim 11, further comprising:
receiving an aggregated bundle comprising a plurality of information signals;
separating the aggregated bundle;
modulating each of the plurality of information signals into a plurality of modulated signals each having a unique carrier frequency; and
transmitting each of the plurality of modulated signals.

13. The method of claim 11, wherein the plurality of modulated signals are transmitted according to a radio network air-interface consistent with that for single-users.

14. The method of claim 11, wherein the aggregating further comprising:
determining a plurality of data rates, one for each of the plurality of information signals; and
scheduling the plurality of information signals according to plurality of data rates.

15. The method of claim 11, wherein the wireless system is a Code Division Multiple Access (CDMA) system.

16. A mobile wireless communication apparatus, comprising:
a memory storage device, storing:
a first set of computer readable instructions operative for implementing a service network, wherein a plurality of information signals are aggregated into a bundle;
a second set of computer readable instructions operative for implementing a radio network;
a multi-link internet protocol processor operative in response to the first set of computer readable instructions for aggregating the plurality of information signals into a bundle; and
a plurality of modulating devices coupled to the multi-link internet protocol processor and operative for demodulating a plurality of signals each having a different carrier frequency to form the plurality of information signals.

17. The wireless communication apparatus of claim 16, wherein the radio network is consistent with an air-interface single user transmission.

18. The wireless communication apparatus of claim 17, wherein the radio network is consistent with a Code Division Multiple Access (CDMA) air-interface single user transmission.

19. The wireless communication apparatus of claim 18, wherein the multi-link internet protocol processor is operative to receive an aggregated bundle and separate the bundle into constituent information signals, and
wherein the plurality of modulating devices are operative for modulating the constituent information signals at different carrier frequencies.

20. The wireless communication apparatus of claim 19, further comprising:
a transceiver coupled to each of the plurality of modulating devices and operative to transmit modulated signals.

* * * * *